(12) United States Patent
Roche et al.

(10) Patent No.: US 7,096,346 B2
(45) Date of Patent: Aug. 22, 2006

(54) MICROPROCESSOR HAVING INSTRUCTIONS FOR EXCHANGING VALUES BETWEEN TWO REGISTERS OR TWO MEMORY LOCATIONS

(75) Inventors: Franck Roche, Trets (FR); André Colomb, Royans (FR)

(73) Assignee: STMicroeletronics SA, Montrouge (FR)

( * ) Notice: Subject to any disclaimer, the term of this patent is extended or adjusted under 35 U.S.C. 154(b) by 297 days.

(21) Appl. No.: 10/273,417

(22) Filed: Oct. 17, 2002

(65) Prior Publication Data

US 2003/0088749 A1 May 8, 2003

(30) Foreign Application Priority Data

Oct. 18, 2001 (FR) ................... 01 13412

(51) Int. Cl.
*G06F 9/315* (2006.01)
*G06F 12/02* (2006.01)
(52) U.S. Cl. ...................... 712/225; 711/165
(58) Field of Classification Search ............... 711/165; 712/220, 223, 225, 226, 227
See application file for complete search history.

(56) References Cited

U.S. PATENT DOCUMENTS

| 3,398,402 A | 8/1968 | Delaigue et al. | 340/172.5 |
| 4,615,004 A | 9/1986 | Chevillat et al. | 364/200 |
| 5,812,845 A * | 9/1998 | Machida | 717/154 |
| 6,145,075 A | 11/2000 | Henry et al. | 712/225 |

OTHER PUBLICATIONS

May et al.; "*The Transputer,*" Neural Computers, Neuss, Sep. 28-Oct. 2, 1987; Proceedings of the Nato Advanced Workshop on Neural Computers, Berlin, pp. 477-486.

* cited by examiner

*Primary Examiner*—Gary Portka
(74) *Attorney, Agent, or Firm*—Lisa K. Jorgenson; Allen, Dyer, Doppelt, Milbrath & Gilchrist, P.A.

(57) ABSTRACT

A microprocessor includes internal registers, an arithmetic and logic unit, and reads a program memory and executes an instruction set stored therein. The instruction set includes at least one instruction for exchanging the contents of both memory locations. The microprocessor includes an additional internal register connected to an output of the arithmetic and logic unit, and transfers the contents of a first one of the memory locations to be exchanged into the additional register when executing the instruction set. The microprocessor further transfers the contents of a second one of the memory locations to be exchanged into the first memory location, and transfers the contents of the additional register into the second memory location.

20 Claims, 1 Drawing Sheet

MICROPROCESSOR HAVING INSTRUCTIONS FOR EXCHANGING VALUES BETWEEN TWO REGISTERS OR TWO MEMORY LOCATIONS

FIELD OF THE INVENTION

The present invention relates to a microprocessor having instructions for exchanging values between two registers or two memory locations. In particular, although not exclusively, the present invention applies to 8-bit microprocessors that process data represented by 8-bit words.

BACKGROUND OF THE INVENTION

In 8-bit microprocessors, the number of instruction codes is normally restricted to 256 ($2^8$). To extend this number, a so-called one-byte pre-code is generally used for specifying that the next instruction code within a program refers to another function than the one referred to by the instruction code without a pre-code. In the case of microprocessors comprising several registers, the instructions that manipulate the contents of some of these registers are only accessible through a pre-code. As a result, on each manipulation of the contents of such a register, the program includes an additional pre-code byte, and the execution of the instruction requires an additional clock cycle for reading and processing the pre-code.

In addition, when it is generally desired to exchange the contents of two memory locations or two registers, or also of a register and a memory location, it is necessary to provide within the program a sequence of instructions comprising an instruction for temporarily saving the contents of a first one of the two memory locations, an instruction for transferring the contents of the second memory location into the first one, and then, an instruction for transferring the saved contents of the first memory location into the second one.

Consequently, this exchange operation implies that three transfer instructions are executed, each one using at least two clock cycles and requiring the temporary use of a memory location or an internal register of the microprocessor. Additionally, when the exchange operation must be performed with a register having access instructions requiring a pre-code, the execution of an exchange operation uses up two additional clock cycles for reading and writing a register with a pre-code.

SUMMARY OF THE INVENTION

In view of the foregoing background, an object of the present invention is to overcome the above described drawbacks without significantly changing the structure of the microprocessor, and without affecting operation of the microprocessor so that it can remain compatible with existing programs.

This and other objects, advantages and features in accordance with the present invention are provided a microprocessor comprising internal registers, an arithmetic and logic unit, and means for reading a program memory and executing an instruction set. According to the present invention, the microprocessor's instruction set includes at least one additional instruction for controlling the exchange of the contents of two memory locations.

The microprocessor preferably comprises an additional internal register interposed at the output of the arithmetic and logic unit, and means for transferring the contents of a first one of the memory locations to be exchanged within the additional register when executing the exchange instruction. The microprocessor preferably further comprises means for transferring the contents of the second memory location to be exchanged within the first memory location, and means for transferring the contents of the additional register into the first memory location.

In this way, the exchange instruction may be advantageously inserted within a program before an instruction sequence involving the register that requires a pre-code. It may thereafter again be inserted at the end of such a sequence for restoring the initial contents of the registers. Advantageously, both memory locations to be exchanged may be located within internal registers of the microprocessor. Alternatively, both memory locations to be exchanged may be respectively located within an internal register of the microprocessor and a memory accessible to the microprocessor.

According to a preferred embodiment of the present invention, the microprocessor further comprises means for reading an instruction code from a memory, and for loading within the additional register, during the same clock cycle, the contents of the register to be exchanged with another memory location.

According to another preferred embodiment of the present invention, all of the instructions in the instruction set of the microprocessor for accessing the contents of at least one of the microprocessor's internal registers are only accessible through a pre-code associated with the instruction code.

According to yet another preferred embodiment of the present invention, the two memory locations to be exchanged are located within a memory that is accessible from the microprocessor both for reading and writing during the same clock cycle.

Alternatively, when the two memory locations to be exchanged are located within a memory accessible from the microprocessor, the microprocessor may further comprise a second additional register interposed at the output of the arithmetic and logic unit. The microprocessor also comprises means for transferring the contents of the second memory location to be exchanged within the additional second register, and means for transferring the contents of the second additional register into the first memory location to be exchanged.

BRIEF DESCRIPTION OF THE DRAWINGS

These and other objects, features and advantages of the present invention will become more readily apparent from the following detailed description of a microprocessor according to the present invention, disclosed in a non-limiting way in reference to the accompanying drawings, in which.

DETAILED DESCRIPTION OF THE PREFERRED EMBODIMENTS

Figure 1:
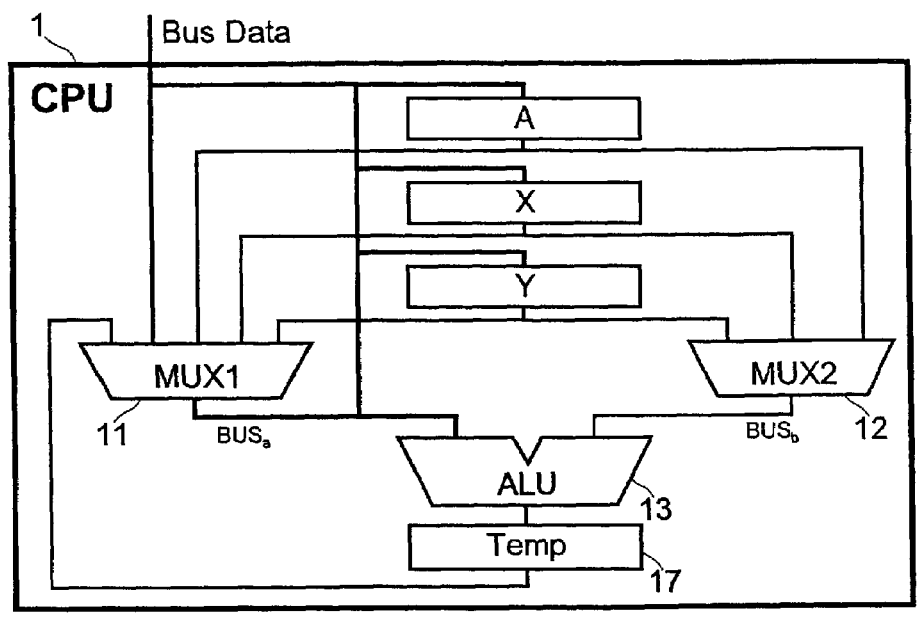
FIGS. 1 and 2 schematically show two alternate embodiments of a portion of the internal architecture of a microprocessor in accordance with the present invention.

Referring now to FIG. 1, a microprocessor 1 comprises in a conventional way internal registers A, X and Y, and an arithmetic and logic unit (ALU) 13 for executing all of the arithmetic and logic operations to be performed by the microprocessor. ALU 13 comprises two inputs respectively coupled to two one-byte parallel buses $BUS_a$ and $BUS_b$. Both of these buses $BUS_a$, $BUS_b$ are respectively connected to the output of two multiplexers 11, 12. The input of registers A, X and Y are connected to $BUS_a$, while their outputs are connected to the inputs of multiplexers 11 and 12.

In this figure, only registers A, X and Y are shown, with register A being the accumulator register and registers X and Y being used as index registers for carrying out, in particular, index addressing operations. The output of the ALU 13 is coupled to an input of the first multiplexer 11, which also has its input coupled to the external data bus of the microprocessor 1.

According to the present invention, a temporary register 17 is interposed on the link between the output of the ALU 13 and one of the two multiplexers 11 and 12. Additionally, the microprocessor's instruction set without a pre-code includes at least one exchange instruction EXG X, Y for exchanging the contents of registers X and Y.

This instruction is advantageously executed within four clock cycles by the microprocessor 1. In the first cycle, the instruction is read from the program memory by the microprocessor 1. In the second cycle, the contents of register Y are transferred into the temporary register 17 through the first multiplexer 11, bus $BUS_a$ and ALU 13. In the third cycle, the contents of register X are transferred into register Y via the first multiplexer 11. In the fourth cycle, the contents of the temporary register 17 are transferred into the register X through the first multiplexer 12 and bus $BUS_a$.

Preferably, exchange instructions EXG A, X and EXG A, Y are also additionally provided between other internal registers, for example, between register A and registers X and Y. Additionally, the contents of register A can also be systematically loaded into the temporary register 17 during the instruction load cycle. In such a case, instruction EXG A, Y or EXG A, Y is executed within three clock cycles. During the first cycle, the instruction is read by the microprocessor 1 which at the same time loads register A into the temporary register 17 via multiplexer 11, bus $BUS_a$ and ALU 13. During the second cycle, the contents of register X or Y are transferred into register A through multiplexer 11 and bus $BUS_a$. In the third cycle, the contents of register 17 are transferred into register X or Y through multiplexer 11 and bus $BUS_a$.

There is also preferably provided an instruction for exchanging the contents of a memory location with those of a register, such as register A: EXG A, mem. In this case, multiplexer 11 also has its input coupled to bus $BUS_a$. This instruction is also executed within three or four clock cycles according to whether or not register A is always loaded into the temporary register 17. In case the microprocessor 1 has few internal registers it is advantageous to provide an instruction for exchanging the contents of two memory locations mem1 and mem2: EXG mem1, mem2.

Figure 2:
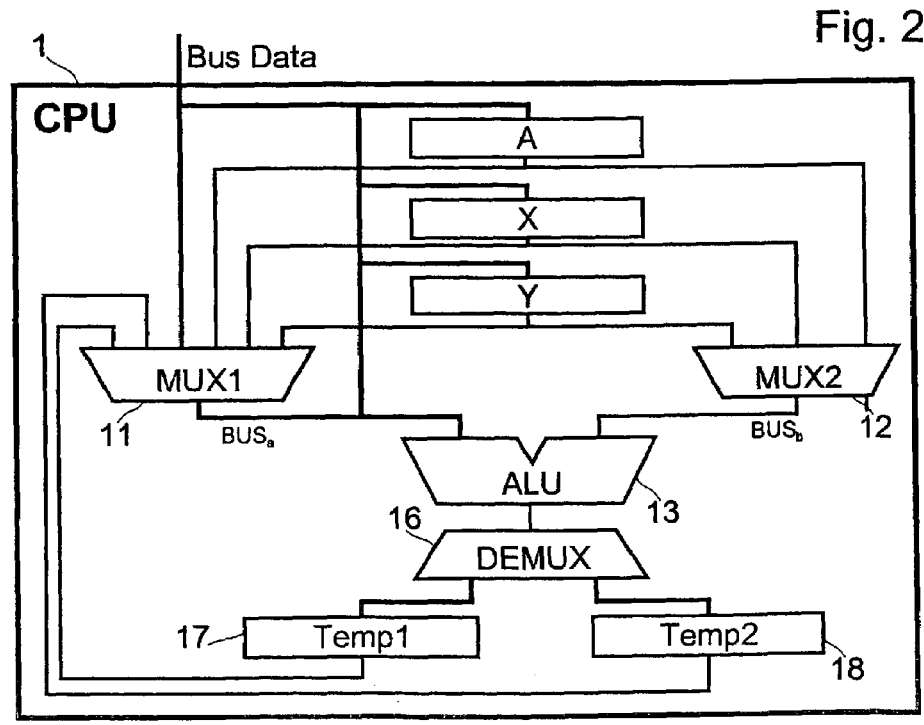

If the memory is accessible for reading and writing during the same clock cycle, this instruction may also be executed within four clock cycles. In the opposite case, the architecture of the microprocessor 1 shown in FIG. 1 should be modified according to the one shown in FIG. 2. In this figure, the output of the arithmetic and logic unit 13 is coupled to a demultiplexer 16 having both of its outputs respectively coupled to temporary register 17 and to a second additional temporary register 18. Demultiplexer 16 chooses which temporary register 17, 18 the output of ALU 13 should be sent to. Also, the output of the two temporary registers 17, 18 are connected to the input of the first multiplexer 11.

In this case, the instruction EXG mem1, mem2 requires five clock cycles for its execution. In the first cycle, the instruction is loaded into the microprocessor 1. In the second and third cycles, the contents of memory locations mem1 and mem2 are respectively loaded into temporary registers 17 and 18. In the fourth and fifth cycles, the respective contents of temporary registers 17 and 18 are respectively loaded into memory locations mem1 and mem2.

It should be noted that the memory containing the location or locations to be exchanged may be a memory that is internal or external to the microprocessor.

That which is claimed is:

1. A microprocessor comprising:
    means for reading instruction codes in a program memory, the instruction codes belonging to a set of instructions executable by the microprocessor, the set of instructions including at least one exchange instruction for exchanging contents between first and second memory locations;
    means for executing an instruction read in the program memory, and comprising means for executing said exchange instruction;
    an arithmetic and logic unit having inputs linked to said memory locations; and
    a first internal register connected to an output of said arithmetic and logic unit and linked to an input of said arithmetic and logic unit;
    said means for executing said exchange instruction performing subsequent to reading an exchange instruction in the program memory during a first clock cycle of the microprocessor
        transferring the contents of the first memory location to said first internal register through said arithmetic and logic unit during a successive second clock cycle;
        transferring the contents of the second memory location to the first memory location during a successive third clock cycle; and
        transferring the contents of said first internal register to the second memory location during a successive fourth clock cycle.

2. The microprocessor according to claim 1, further comprising at least one second internal register connected to said arithmetic and logic unit; and wherein the first memory location is in said second internal register.

3. The microprocessor according to claim 2, wherein reading an instruction code in the program memory and transferring the contents of said at least one second internal register to said first internal register are performed during said first clock cycle of the microprocessor.

4. The microprocessor according to claim 2, wherein the second memory location is in a memory that is accessible to the microprocessor.

5. The microprocessor according to claim 2, wherein instructions in the set of instructions for accessing the contents of said least one second internal register comprise a pre-code associated with an instruction code; and wherein the exchange instruction comprises only an instruction code.

6. The microprocessor according to claim 1, wherein the first and second memory locations are in a memory that is accessible to the microprocessor for reading and writing during a same clock cycle.

7. The microprocessor according to claim 1, wherein the first and second memory locations are in a memory that is accessible to the microprocessor; the microprocessor further comprising
    a second internal register connected to the output of said arithmetic and logic unit;
    said means for executing said exchange instruction performing:

transferring the contents of the second memory location to said second internal register during one clock cycle, and transferring the contents of said second internal register to the first memory location during another clock cycle.

8. The microprocessor according to claim 2, further comprising a third internal register connected to said arithmetic and logic unit, the second memory location being in said third internal register.

9. A microprocessor comprising:

a first internal register;

an arithmetic and logic unit connected to said first internal register;

a second internal register connected to an output of said arithmetic and logic unit; and means for reading instruction code stored in a program memory during a first clock cycle and for transferring the contents of the first internal register to said second internal register during said first clock cycle, said instruction code belonging to an instruction set of instructions executable by the microprocessor, the instruction set comprising at least one exchange instruction for exchanging contents between said first internal register and a memory location, means for executing said exchange instruction performing subsequent to reading an exchange instruction in the program memory during a first clock cycle of the microprocessor transferring the contents of the memory location to the first internal register during a successive second clock cycle, and transferring the contents of said second internal register to the memory location during a successive third clock cycle.

10. The microprocessor according to claim 9, further comprising a third internal register; and wherein the memory location is in said third internal register.

11. The microprocessor according to claim 9, wherein the memory location is in a memory that is accessible to the microprocessor.

12. The microprocessor according to claim 9, wherein instructions in the instruction set for accessing the contents of said first internal register comprise a pre-code associated with an instruction code; and wherein the exchange instruction comprises only an instruction code.

13. A method for operating a microprocessor for exchanging contents between first and second memory locations, the microprocessor comprising an arithmetic and logic unit and a first internal register connected to an output of the arithmetic and logic unit, the method comprising:

reading a program memory and executing instructions read therein, the instructions belonging to a set of instructions executable by the microprocessor and comprising at least one exchange instruction for exchanging contents between first and second memory locations, and subsequent to reading an exchange instruction in the program memory during a first clock cycle transferring the contents of the first memory location to the first internal register during a successive second clock cycle;

transferring the contents of the second memory location to the first memory location during a successive third clock cycle; and transferring the contents of the first internal register to the second memory location during a successive fourth clock cycle.

14. The method according to claim 13, further comprising at least one second internal register; and wherein the first memory location is in the at least one second internal register.

15. The method according to claim 14, wherein an instruction code is read in the program memory and the contents of the at least one second internal register are transferred to the first internal register during said first clock cycle.

16. The method according to claim 14, wherein the second memory location is in a memory that is accessible to the microprocessor.

17. The method according to claim 14, wherein instructions in the instruction set for accessing the contents of the least one second internal register comprise a pre-code associated with an instruction code; and wherein the exchange instruction comprises only an instruction code.

18. The method according to claim 13, wherein the first and second memory locations are in a memory that is accessible to the microprocessor for reading and writing during a same clock cycle.

19. The method according to claim 13, wherein the first and second memory locations are in a memory that is accessible to the microprocessor; the microprocessor further comprising a third internal register connected to the output of the arithmetic and logic unit; said method further comprising:

transferring the contents of the second memory location to the third internal register during one clock cycle; and transferring the contents of the third internal register to the first memory location during another clock cycle.

20. The method according to claim 14, wherein the microprocessor further comprises a third internal register connected to the arithmetic and logic unit, the second memory location being in the third internal register.

* * * * *